United States Patent
Kucharski et al.

(10) Patent No.: US 8,788,166 B1
(45) Date of Patent: Jul. 22, 2014

(54) DOWNSHIFT CONTROLS USING MEASURED OUTPUT TORQUE

(71) Applicant: Ford Global Technologies, LLC, Dearborn, MI (US)

(72) Inventors: Joseph F. Kucharski, Livonia, MI (US); Nimrod Kapas, Canton, MI (US); Yuji Fujii, Ann Arbor, MI (US); Gregory Michael Pietron, Canton, MI (US); Diana Yanakiev, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/779,848

(22) Filed: Feb. 28, 2013

(51) Int. Cl.
- G06F 7/00 (2006.01)
- B60W 10/04 (2006.01)
- G06F 17/00 (2006.01)
- F16H 61/02 (2006.01)

(52) U.S. Cl.
- CPC ............................ F16H 61/0204 (2013.01)
- USPC ................. 701/60; 477/6; 477/107; 701/51

(58) Field of Classification Search
- USPC ................................................ 701/60; 477/6
- See application file for complete search history.

(56) References Cited

U.S. PATENT DOCUMENTS

| | | | |
|---|---|---|---|
| 4,724,723 A | 2/1988 | Lockhart et al. | |
| 5,058,460 A | 10/1991 | Hibner et al. | |
| 5,608,626 A | 3/1997 | Ibamoto et al. | |
| 5,758,302 A * | 5/1998 | Schulz et al. | 701/51 |
| 5,951,615 A | 9/1999 | Malson | |
| 6,931,315 B2 | 8/2005 | Ayabe et al. | |
| 6,961,646 B2 | 11/2005 | Soliman et al. | |
| 6,991,584 B2 | 1/2006 | Cowan | |
| 7,089,102 B2 * | 8/2006 | Slayton et al. | 701/51 |
| 7,107,135 B2 | 9/2006 | Soliman et al. | |
| 7,261,671 B2 * | 8/2007 | Ortmann et al. | 477/6 |
| 7,294,092 B2 * | 11/2007 | Walker et al. | 477/107 |
| 7,331,899 B2 * | 2/2008 | Ortmann et al. | 477/6 |
| 7,774,118 B2 | 8/2010 | Hata et al. | |
| 8,131,436 B2 | 3/2012 | Suzuki et al. | |
| 8,224,538 B2 | 7/2012 | Zhang et al. | |
| 8,249,786 B2 | 8/2012 | Yoshino et al. | |
| 8,255,130 B2 | 8/2012 | Fujii et al. | |
| 8,340,878 B2 * | 12/2012 | Oue et al. | 701/67 |
| 2005/0054480 A1 * | 3/2005 | Ortmann et al. | 477/6 |
| 2005/0060077 A1 * | 3/2005 | Slayton et al. | 701/51 |
| 2007/0270277 A1 * | 11/2007 | Ortmann et al. | 477/5 |
| 2008/0058158 A1 | 3/2008 | Kobayashi et al. | |
| 2010/0292901 A1 * | 11/2010 | Ortmann et al. | 701/67 |

* cited by examiner

*Primary Examiner* — Thomas G Black
*Assistant Examiner* — Tyler Paige
(74) *Attorney, Agent, or Firm* — James Dottavio; MacMillan, Sobanski & Todd, LLC

(57) ABSTRACT

A downshift control method during a coasting drive condition includes computing changes in output torque and input speed from initial output torque and initial input speed; reducing offgoing element pressure, provided a change in input speed exceeds a reference input speed change; using closed loop control based on output torque and a change in measured output torque to adjust oncoming element pressure such that output torque remains between predetermined maximum and minimum torques; and fully engaging the oncoming element.

16 Claims, 5 Drawing Sheets

| CONTROL ELEMENT APPLICATION CHART | | | | | | |
|---|---|---|---|---|---|---|
| GEAR | C456 | C35R | CB26 | CBLR | CB1234 | OWC |
| 1 | | | | CB | X | X |
| 2 | | | X | | X | O/R |
| 3 | | X | | | X | O/R |
| 4 | X | | | | X | O/R |
| 5 | X | X | | | | O/R |
| 6 | X | | X | | | O/R |
| REV | | X | | X | | − |

Fig. 2

DOWNSHIFT CONTROLS USING MEASURED OUTPUT TORQUE

BACKGROUND OF THE INVENTION

1. Field of the Invention

This invention relates generally to controlling an automatic transmission downshift during a coasting drive condition when a tie-up or neutral case occurs as evidenced by measured output torque.

2. Description of the Prior Art

Friction elements, i.e., the clutches and brakes, are utilized to alter a torque path within the gear sets to establish desired torque and speed ratios between input and output of an automatic transmission system. During a vehicle operation, a combination of engaged friction control elements determines a specific gear position in which an automatic transmission operates. When the vehicle is in a coasting condition wherein the vehicle continues to move forward while both acceleration pedal and brake pedal are released, a transmission controller may initiate the so called coasting downshift as the vehicle slows down. During the downshift process, some friction elements, referred to as off-going elements, are released while others, referred to as on-coming elements, are engaged, altering torque and speed relationship between input and output of the transmission.

A neutral state, i.e., a state in which no torque path is dominantly established within the gear sets, is caused by premature release of an offgoing control element or lack of oncoming control element torque capacity. When the neutral state occurs during a coasting downshift, a driver may perceive a shift shock or a momentary loss of drive torque. Additionally, if the driver steps in an acceleration pedal during the neutral state, engine speed may surge, followed by a shift shock due to a sudden engagement of on-coming element. The neutral state is not generally detectable by means of the sensors, such as transmission speed sensors, that are commonly available in volume production vehicles.

A transmission tie-up at a level perceptible to the driver may be caused by delayed release of the offgoing control element or torsional overcapacity of the oncoming control element, causing the gear sets to be over-constrained. When the tie-up state occurs during the coasting downshift, a driver may perceive a shift shock or a sudden loss of drive torque. A severe tie-up state may be detected by observing a measurable drop of transmission input speed signals in volume production vehicles. When the severe tie-up is detected, a controller may quickly reduce off-going clutch pressure to resolve the condition.

According to prior art coasting shift control methodologies, control pressure of off-going element is reduced through an open-loop approach while control pressure of on-coming clutch is raised through an open-loop approach. Open-loop pressure controls for both off-going clutch and on-coming clutch may be adaptively adjusted. That is, after completing each shift event, a transmission controller may adjust open-loop pressure profile for off-going element by a pre-determined amount to delay its release timing while prescribing faster pressure rise for on-coming clutch element by a pre-determined amount. This adjustment brings the coasting shift control toward tie-up state. When the tie-up is detected through speed measurements, the controller may reduce off-going element control pressure for its immediate release within the given shift. The detection of the tie-up state enables the controller to adaptively prescribe the control pressure profiles for avoiding both neutral and tie-up states in the subsequent coasting down-shift events.

The prior art methodologies that primarily rely on speed measurements can neither explicitly detect nor correct the neutral state within the current coasting downshift event. The prior art methodologies that primarily rely on speed sensors may detect the tie-up state, but does not provide means to control the amount of dropped drive torque level during the coasting downshift event. The adaptive open-loop pressure adjustments may not work well because off-going and on-coming clutch friction torques may unpredictably vary under different operating conditions even if control pressure profiles remain unchanged. The prior art adaptive pressure adjustments may not be able to account for changing hydraulic control system variability. Accordingly, even if optimal pressure profiles are adaptively identified, they may not be optimal for the subsequent shifts and neutral or tie-up state may still occur.

SUMMARY OF THE INVENTION

A downshift control method, during a coasting drive condition where a vehicle continues to move forward while both acceleration pedal and brake pedal are released, includes computing changes in output torque and input speed from initial output torque and initial input speed; reducing offgoing element pressure, provided a change in input speed exceeds a reference input speed change; using closed loop control based on output torque and a change in measured output torque to adjust oncoming element pressure such that output torque remains between predetermined maximum and minimum torques; and fully engaging the oncoming element.

The control strategy relies on direct measurement of output torque, which indicates the level of discomfort (called shift feel) perceptible to the occupants of a motor vehicle.

A controller adjusts or accelerates the offgoing control element release process based on the level of turbine speed dip when a tie-up state is detected.

The controller may also use a dip in output torque to adjust the offgoing control element release pressure profile.

The controller adjusts or reduces oncoming clutch pressure based on the level of the output torque dip.

The controller may also use a dip in turbine speed to adjust the oncoming control element pressure profile.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is chart showing the state of control elements corresponding to each gears produced by the transmission of FIG. 1;

DESCRIPTION OF THE PREFERRED EMBODIMENT

Figure 1:
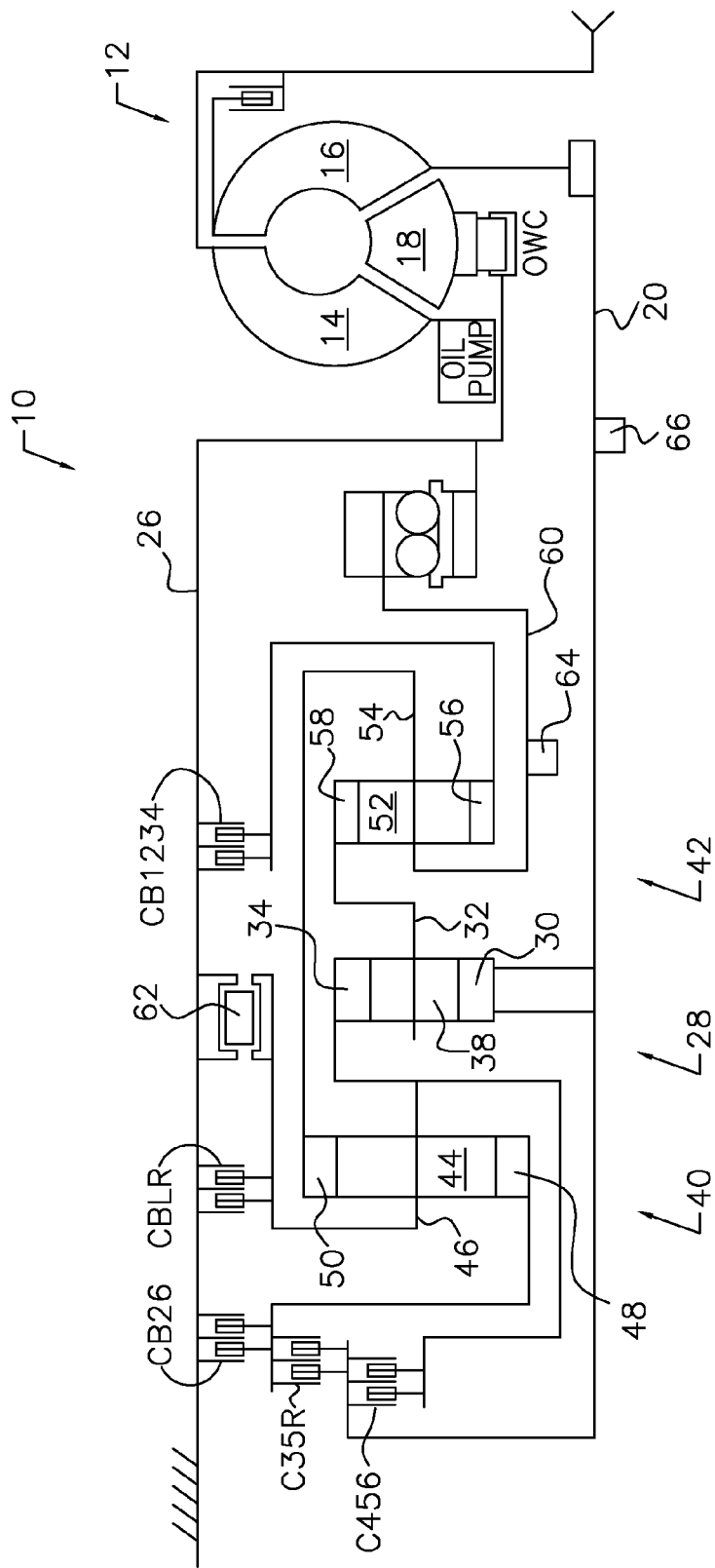
FIG. 1 is a schematic diagram showing the kinematic arrangement of a transmission.

FIG. 1 illustrates gearing, clutches, brakes, shafts and other components of a multiple-speed automatic transaxle 10 capable of producing six forward speed ratios and reverse drive.

A torque converter 12 includes an impeller 14 driven by an engine, a turbine 16 hydrokinetically coupled to the impeller, and a stator 18 between the impeller and turbine. A transmission input shaft 20 is secured to the turbine 16. The stator 18 is secured against rotation to a transmission case 26.

A gearset 28 includes a sun gear 30, secured to input shaft 20; a carrier 32; a ring gear 34; and planet pinions 38 supported on carrier 32 and meshing with sun gear 30 and ring gear 34.

Rear gearset 40 and front gearset 42 are also simple planetary gearsets. Gearset 40 includes planet pinions 44 supported for rotation on a carrier 46 and meshing with both a sun gear 48 and a ring gear 50. Gearset 42 includes planet pinions 52 supported for rotation on carrier 54 and meshing with both a sun gear 56 and ring gear 58.

Overdrive clutch C456 is secured to carrier 46 and ring gear 34. Clutch 35R is secured to sun gear 48. Intermediate brake CB26 is 34 is secured to sun gear 48 and to transmission case 26. Low reverse brake CBLR is secured to carrier 46, and transmission case 26. Forward brake CB1234 is secured to sun gear 56 and output shaft 60. A one-way clutch OWC 62 is secured to carrier 46, ring gear 34, clutch CBLR and case 26. The transmission is equipped with an input speed sensor 64 and driveline torque sensor 66.

Although a downshift may occur between any of the forward gears during a coasting drive condition where engine torque is typically reduced to a low level, the downshift control method is described with reference to a 3-2 downshift. As FIG. 2 shows, third gear is produced when clutch C35R and brake CB1234 are engaged concurrently and OWC 62 overruns. A downshift to second gear is produced when the offgoing control element (clutch C35R) is disengaged, the oncoming control element (brake CB26) is engaged, brake CB1234 remains engaged and OWC 62 continues to overrun.

A downshift may occur with a tie-up case, which occurs when the offgoing element C35R and oncoming element CB26 both have enough torque capacity such that they compete for the dominant torque path through the transaxle 10, resulting in a reduction in output torque, carried on output shaft 60 and a reduction in turbine speed, i.e., the speed of input shaft 20. While the transmission gears are in a tie-up situation, clutch C35R may be securely engaged or may start slipping while carrying torque capacity.

Alternatively a downshift may occur with a neutral case, which occurs when the offgoing element C35R and oncoming element CB26 both slip, due to their having insufficient torque capacity, and without being able to establish a dominant torque path.

Figure 3:
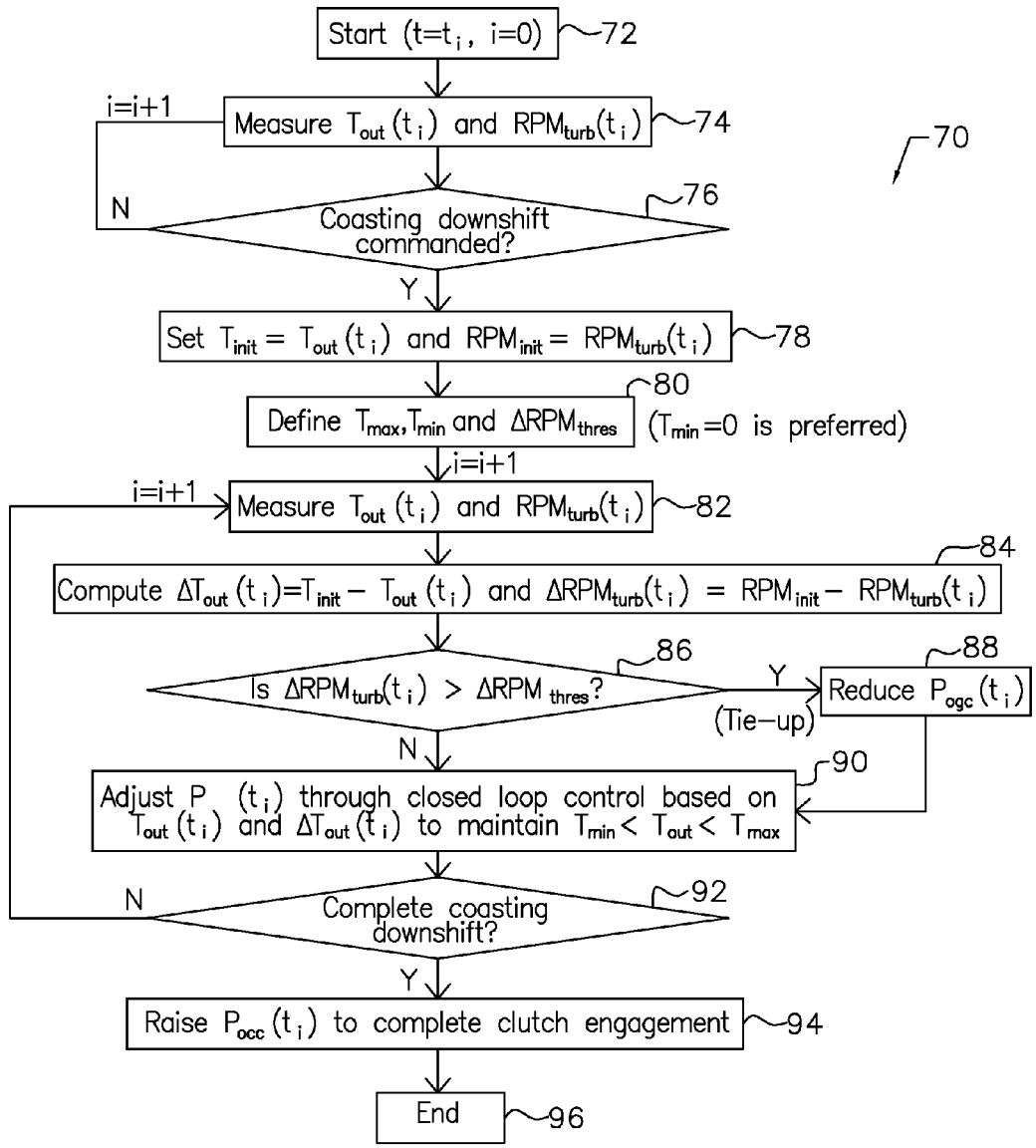
FIG. 3 illustrates an algorithm that controls a downshift.

FIG. 3 illustrates an algorithm 70, which is repetitively executed at intervals of about 7 ms and controls a downshift with tie-up and neutral cases during a coasting drive condition. After starting the algorithm at step 72, the magnitude of torque carried by output shaft 60 and the speed of input shaft 20 before the downshift occurs are measured using a torque sensor 64 and a speed sensor 66, at step 74. Torque sensor 64 produces an electronic signal representing $T_{out}$ the magnitude of torque carried by output shaft 60. Speed sensor 66 produces an electronic signal representing $RPM_{turb}$, the speed of input shaft 20.

Figure 4:
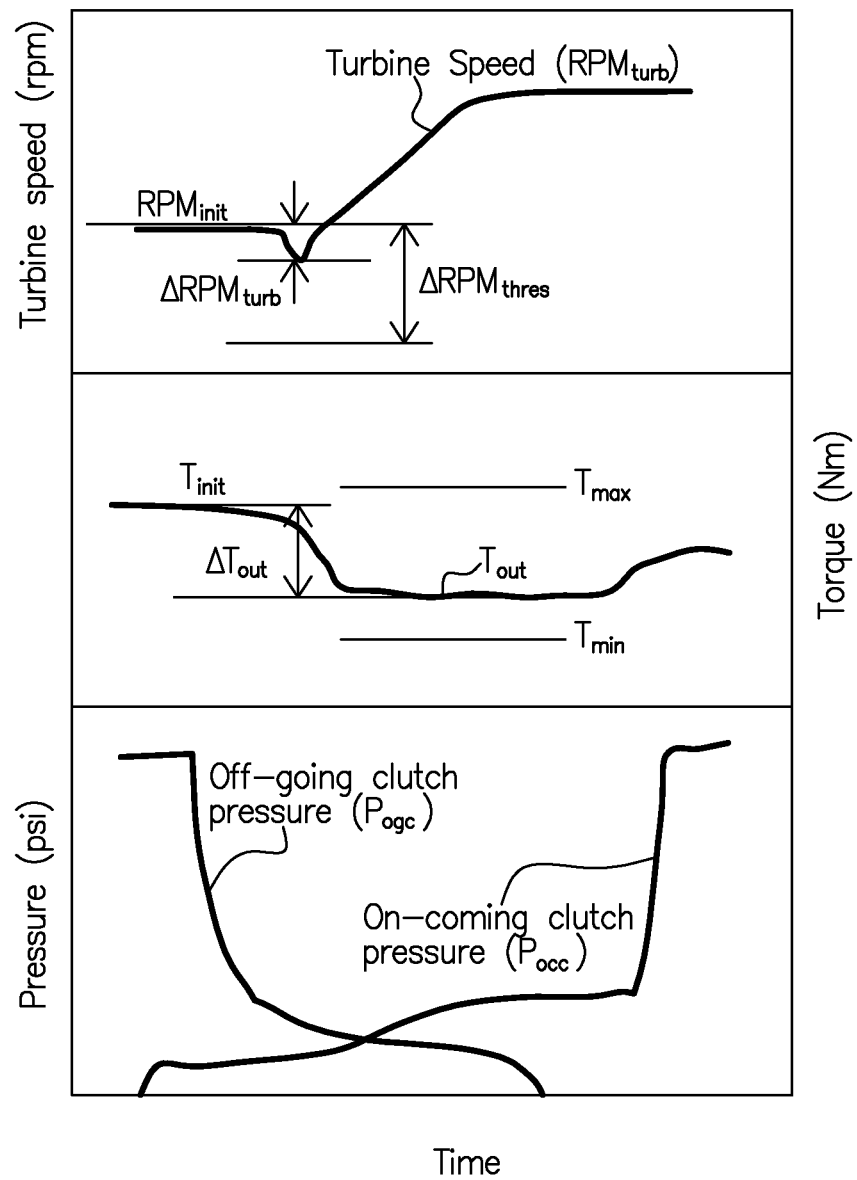
FIG. 4 contains graphs of the turbine speed, output torque, and hydraulic pressure supplied to the servos that actuate the offgoing element and oncoming element.

FIG. 4 contains graphs of the turbine speed, output torque, and hydraulic pressure supplied to the servos that actuate the offgoing element Pogc C35R and the oncoming element Pocc CB26.

At step 76 a test is performed to determine whether a coasting downshift has been commanded by a transmission controller. If the result of test 76 is logically negative, control returns to step 74 and the index (i) is incremented.

If the result of test 76 is logically positive indicating that the downshift has begun, at step 78 the magnitude of the following variables are established: $T_{init}=T_{out}$ (t$_1$) and $RPM_{init}=RPM_{turb}$ (t$_i$), as represented in FIG. 4.

At step 80 the magnitude of the following reference output torques and input speed, as represented in FIG. 4, are established and stored in electronic memory accessible to the controller that control transmission gear shifts: $T_{max}$, $T_{min}$ and $\Delta RPM_{thres}$ with $T_{min}$ preferably set equal to 0 if $T_{init}$ is sufficiently larger than zero. When $T_{init}$ is close to zero or below zero, $T_{min}$ may be set to a negative value.

The index (i) is incremented and control advances to step 82 where $T_{out}$ (ti) and $RPM_{turb}$ (ti) are measured again.

At step 84 the following computations are performed:

$$\Delta T_{out}(ti)=T_{init}-T_{out}(ti)$$

$$\Delta RPM_{turb}(ti)=RPM_{init}-RPM_{turb}(ti)$$

At step 86 a test is performed to determine whether $$\Delta RPM_{turb}(ti)>\Delta RPM_{thres}$$

If the result of test 86 is true, thereby indicating a tie-up is present, at step 88 the pressure Pogc (ti) of the offgoing element C35R is reduced based on the level of $\Delta RPM_{turb}$ and control advances to step 90.

If the result of test 86 is false, control advances to step 90 where pressure Pocc (ti) of the oncoming element CB26 is adjusted through closed loop control based on $T_{out}$ (ti) and $\Delta T_{out}$ (ti) to maintain $T_{min}<T_{out}<T_{max}$.

At step 92 a test is performed to determine whether the coasting downshift is to be completed. If the result of test 92 is negative, control returns to step 82. This loop continues as long as the transmission controller desires to maintain output torque level between $T_{max}$ and $T_{min}$, without completing downshift, while allowing both off-going clutch C35R and on-coming clutch CB26 to slip at non-zero torque capacity, respectively. Alternatively, torque capacity level of clutch C35R may be reduced to a non-significant level to allow clutch CB26 to dominantly affect an output torque level between $T_{max}$ and $T_{min}$ while it continues to slip without completing engagement.

If the result of test 92 is positive, that is, if the transmission controller determines that the coasting downshift is to be completed, at step 94 pressure Pocc (ti) of the oncoming element CB26 is increased to complete the downshift by fully engaging element CB26.

At step 96 execution of the downshift algorithm 70 is terminated.

The algorithm 70 in FIG. 3 can be directly applied, excluding the step 88, to on-coming clutch pressure control during a coasting down shift event for a transmission system wherein an off-going element is an over-running one-way-type torque coupling.

Figure 5:
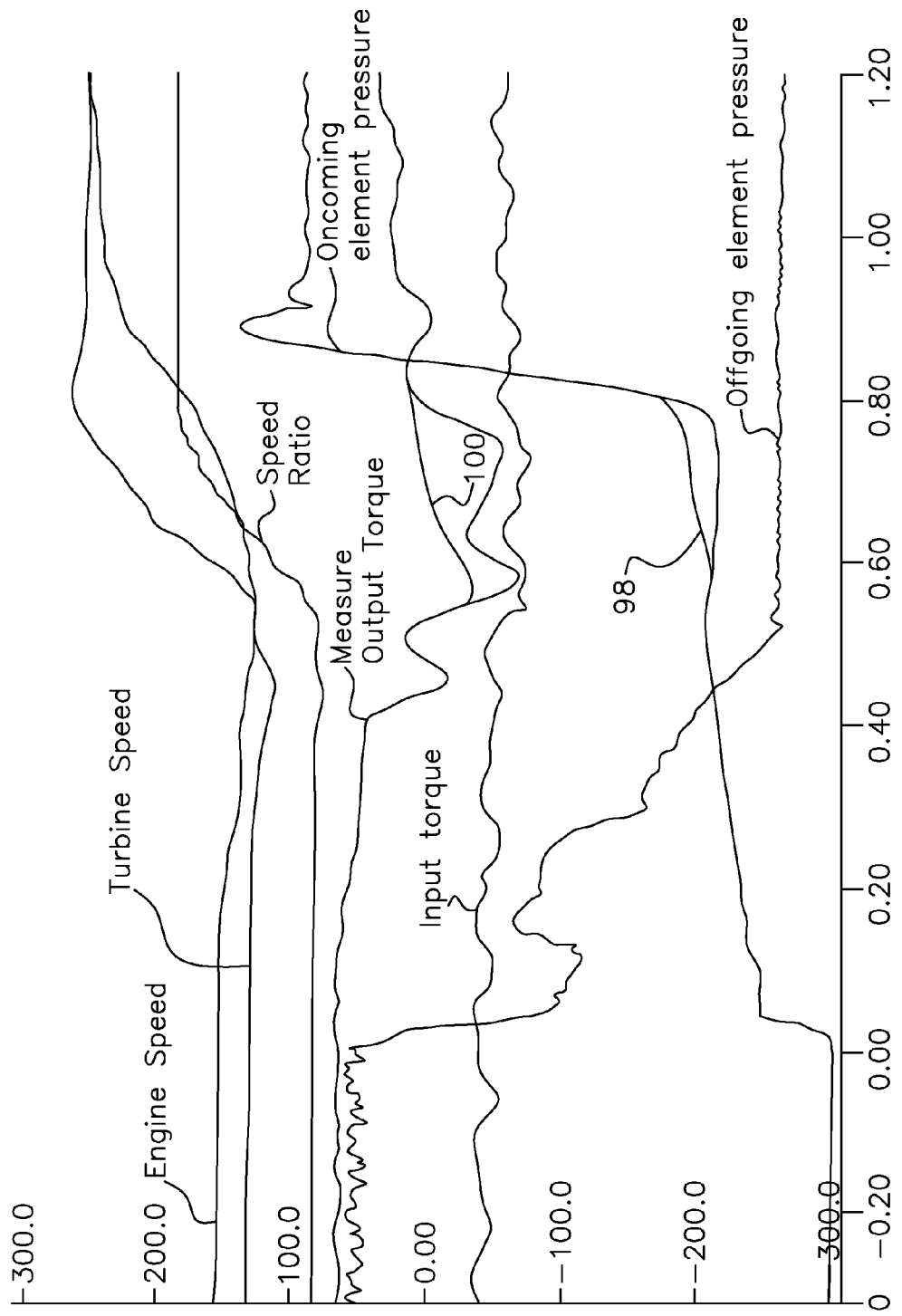
FIG. 5 is a graph showing the variation over time of driveline variable during a coasting downshift.

FIG. 5 is a graph showing the variation over time of driveline variables during a coasting downshift, wherein a lack of torque capacity, detected from the measured output torque, is compensated by increasing the oncoming control element pressure at 98 to reduce the output torque hole at 100 after an off-going clutch starts slipping, due to reduced torque capacity, to initiate turbine speed change.

In accordance with the provisions of the patent statutes, the preferred embodiment has been described. However, it should be noted that the alternate embodiments can be practiced otherwise than as specifically illustrated and described. For example, the elements of the invented method can be readily employed using output torque level inferred or indicated indirectly by sensory signals other than direct torque measurements.

The invention claimed is:

1. A method for controlling a transmission downshift during a coasting drive condition where a vehicle continues to move forward while both an acceleration pedal and a brake pedal are released, comprising:
   determining initial output torque before the downshift;
   directly measuring initial input speed before the downshift;
   starting the downshift by initiating offgoing element pressure reduction and stroking an oncoming element;
   establishing maximum and minimum values of output torque and a reference change in input speed for the downshift;
   measuring output torque and input speed;
   computing a change in output torque from the initial output torque and a change in input speed from the initial input speed;
   reducing offgoing element pressure to allow an offgoing clutch to slip;
   further reducing offgoing element pressure, provided the change in input speed exceeds the reference change in input speed;
   using closed loop control based on output torque and the change in output torque to adjust oncoming element pressure such that output torque is between its maximum and minimum values without allowing on-coming clutch to securely engage and without allowing the downshift to complete as long as completion of downshift is not desired;
   completing the downshift by increasing oncoming element pressure when said completion is desired.

2. The method of claim 1, wherein initial output torque is determined by direct measurement.

3. The method of claim 1, wherein initial output torque is determined inferentially indirectly based on sensory signals.

4. A downshift control method during a coasting drive condition wherein a vehicle continues to move forward while engine torque is maintained level, comprising:
   (a) computing changes in output torque and input speed from initial output torque and initial input speed;
   (b) reducing offgoing element pressure to allow its slip and raising on-coming element pressure;
   (c) further reducing offgoing element pressure, provided a change in input speed exceeds a reference input speed change;
   (d) using closed loop control based on output torque and a change in measured output torque to adjust oncoming element pressure such that output torque remains between predetermined maximum and minimum torques without allowing an oncoming element to engage securely and without allowing the downshift to complete as long as completion of downshift is not desired;
   (e) fully engaging the oncoming element only when completion of downshift is desired.

5. The method of claim 4, wherein step (a) further comprises:
   directly measuring the initial output torque and the initial input speed before the downshift;
   starting the downshift;
   directly measuring output torque and input speed during the downshift.

6. The method of claim 4, wherein step (b) further comprises:
   establishing a reference change in input speed for the downshift;
   measuring input speed;
   comparing the change in input speed to the reference change in input speed.

7. The method of claim 4, wherein step (c) further comprises:
   establishing the maximum and minimum values of output torque for the downshift;
   directly measuring initial output torque and initial input speed before the downshift;
   computing a change in output torque from the initial output torque and a change in input speed from the initial input speed.

8. The method of claim 4 wherein step (d) further comprises completing the downshift during a coasting drive condition by increasing oncoming element pressure to fully engaging the oncoming element when completion of downshift is desired.

9. The method of claim 1 wherein the transmission downshift is a non-synchronous downshift.

10. A downshift control method during a coasting drive condition wherein a vehicle continues to move forward while both an acceleration pedal and a brake pedal are released, comprising:
   (a) computing changes during the downshift in output torque and input speed from initial output torque and initial input speed;
   (b) using closed loop control based on output torque and a change in measured output torque to adjust oncoming element pressure such that output torque remains between predetermined maximum and minimum torques;
   (c) fully engaging an oncoming element when the downshift is to be completed.

11. The method of claim 10, wherein step (a) further comprises:
   measuring the initial output torque and the initial input speed before the downshift;
   starting the downshift; and
   directly measuring output torque and input speed during the downshift.

12. The method of claim 10, wherein step (b) further comprises:
   establishing the maximum and minimum values of output torque for the downshift;
   directly measuring initial output torque and initial input speed before the downshift;
   computing a change in output torque from the initial output torque and a change in input speed from the initial input speed.

13. The method of claim 10 wherein step (c) further comprises completing the downshift by increasing oncoming element pressure to fully engage the oncoming element.

14. The method of claim 10 wherein the method controls a non-synchronous transmission downshift.

15. A method for maintaining output torque of a vehicle transmission in a desired range during a coasting downshift, comprising:

controlling offgoing element pressure and oncoming element pressure such that an offgoing element and an oncoming element continuously slip while maintaining non-zero torque capacity of the offgoing element and the oncoming element and without allowing the oncoming element to engage fully and without completing the downshift.

16. The method of claim 15 wherein the transmission downshift is a non-synchronous downshift.

* * * * *